F. S. KOCHENDORFER.
BAKING OVEN.
APPLICATION FILED NOV. 11, 1916.
1,252,813.
Patented Jan. 8, 1918.
2 SHEETS—SHEET 1.
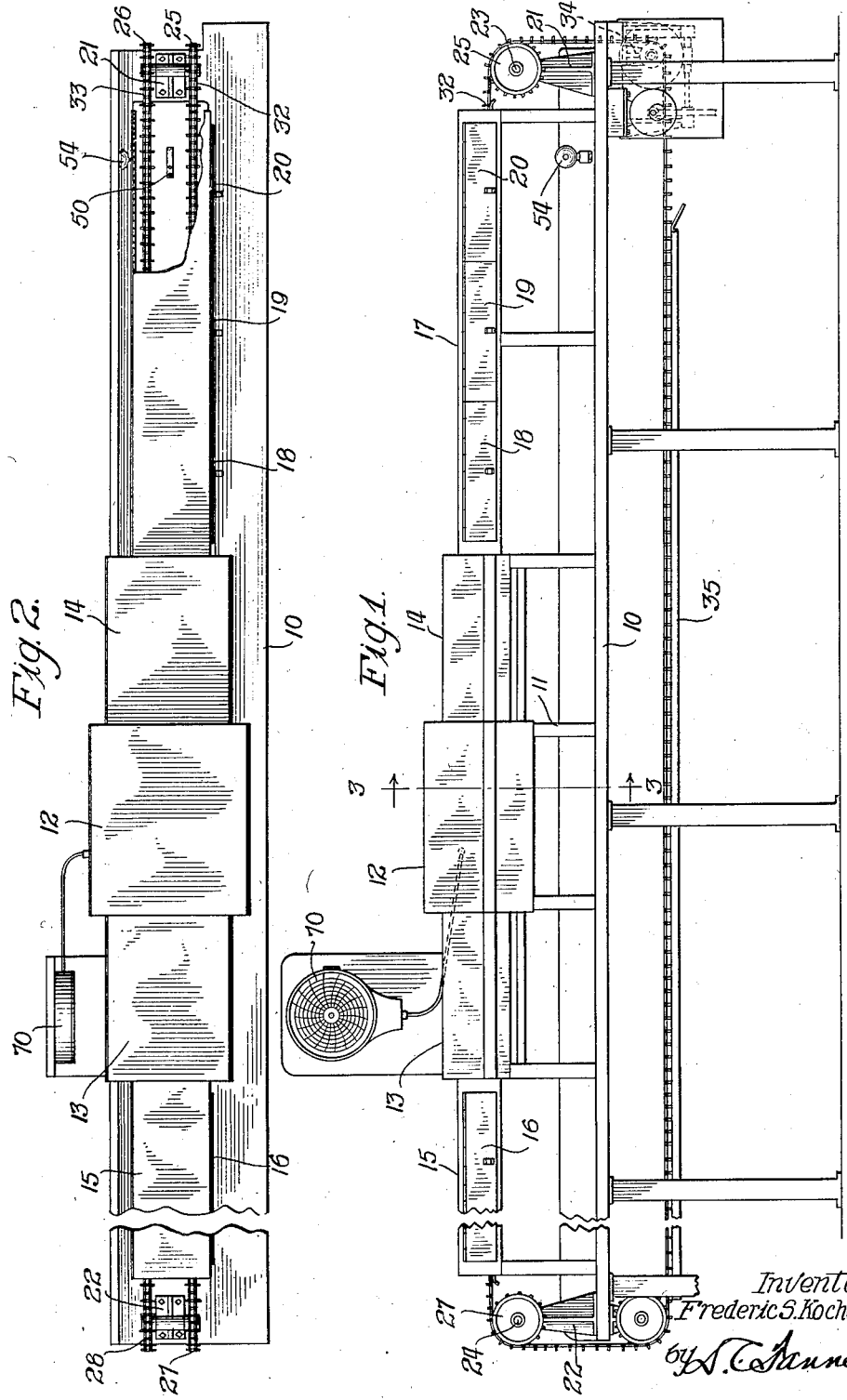
Inventor
Frederic S. Kochendorfer

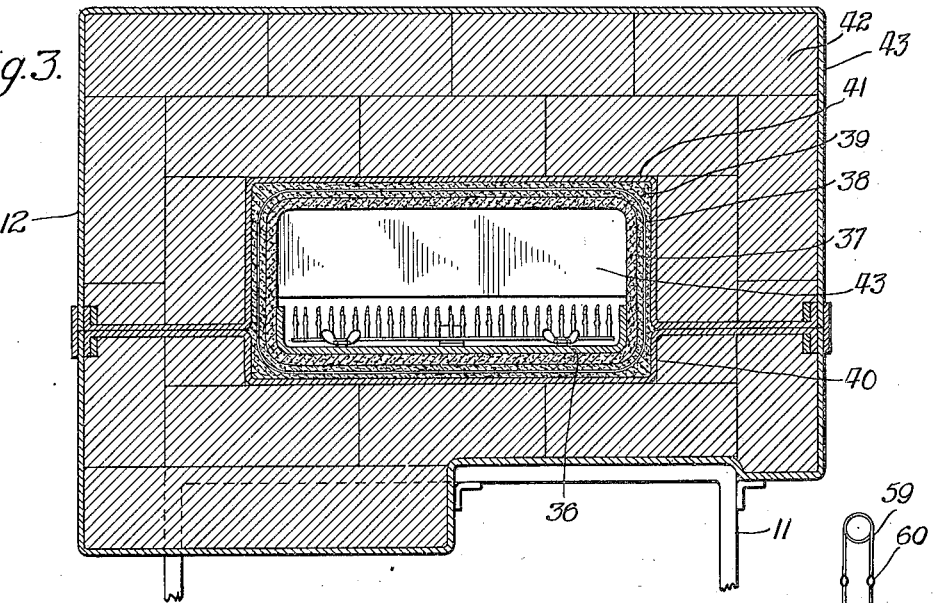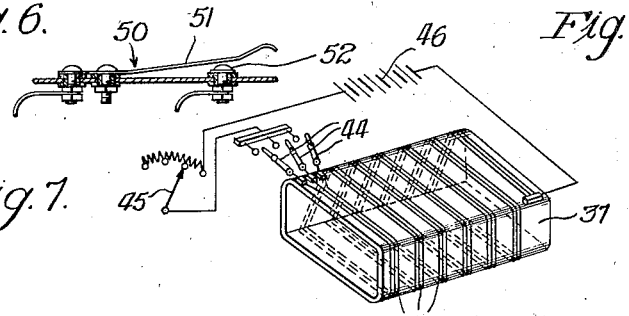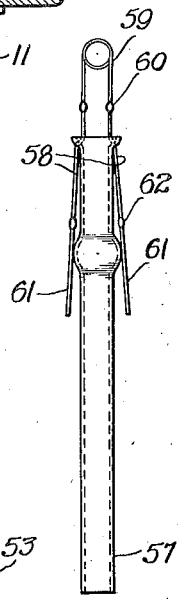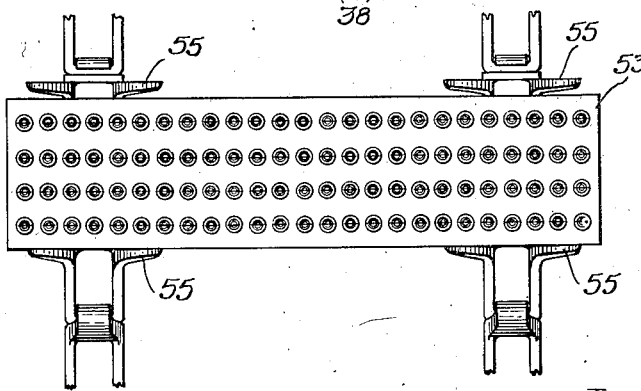

UNITED STATES PATENT OFFICE.

FREDERIC S. KOCHENDORFER, OF CHICAGO, ILLINOIS, ASSIGNOR TO WESTERN ELECTRIC COMPANY, INCORPORATED, OF NEW YORK, N. Y., A CORPORATION OF NEW YORK.

BAKING-OVEN.

1,252,813.   Specification of Letters Patent.   Patented Jan. 8, 1918.

Application filed November 11, 1916. Serial No. 130,749.

*To all whom it may concern:*

Be it known that I, FREDERIC S. KOCHENDORFER, a citizen of the United States, residing at Chicago, in the county of Cook and State of Illinois, have invented certain new and useful Improvements in Baking-Ovens, of which the following is a full, clear, concise, and exact description.

This invention relates to baking ovens, and more particularly to an improved form of oven for baking incandescent lamp filaments.

The object of this invention is to provide an apparatus to bake incandescent lamp filaments which will perform this operation in such a manner that the results will be constant and reliable. The purpose of the construction as herein disclosed is to eliminate the various uncertain factors which heretofore have entered into the operation of baking lamp filaments, such as the personal equation introduced by the operator, which results in variations in the filament baking periods and in an uneven application of heat.

One of the principal advantages sought and obtained by this apparatus is the gradual, constant, and regular rise in temperature of the filament as it approaches the main baking chamber, the similar gradual, constant, and regular decrease in temperature as the filament recedes from the main baking chamber, together with a constant temperature maintained in the main baking chamber, and a definite prescribed time interval automatically controlled, during which the filament is subjected to the baking process.

These and other features will appear from the following detailed description and the appended claims.

The invention is illustrated in the accompanying drawings in which:

Figure 1 illustrates a side elevation of the complete apparatus;

Fig. 2 is a top elevation partly in section of the same;

Fig. 3 is a vertical section on the line 3—3 of Fig. 1;

Fig. 4 is a sectional view of the chain drive showing a filament carrying plate in position thereon;

Fig. 5 is a side elevation of a mounted stem filament assembly;

Fig. 6 is a side elevation of the alarm contact spring; and

Fig. 7 is a circuit diagram illustrating the method of applying the resistor to the baking chamber.

In the form illustrated in the drawings the apparatus is mounted on a table or work bench 10 which is elevated from the floor by any well-known means. The baking apparatus or oven is elevated from the table 10 by a series of suitable supports such as 11. On these supports are mounted the main baking chamber 12, the preheating chamber 13, and the cooling chamber 14. Directly connected to the pre-heating chamber 13 is an admission chamber 15 fitted with a suitable door 16 which may be opened to admit filaments which are to be baked. Directly connected to the cooling chamber is the chamber 17 equipped with doors 18, 19, and 20, through either one of which the filaments may be removed from the baking apparatus after they leave the cooling chamber 14.

Mounted on the top of the bench 10 at either end thereof are the standards 21 and 22, in which are mounted the shafts 23 and 24 respectively, which carry the sprocket wheels 25, 26, 27, and 28 respectively. Depending from the lower surface of the bench 10 are similar brackets which are equipped with a shaft and sprocket wheels in the same manner as the brackets 21 and 22 mounted on the top surface of the bench. These sprocket wheels are inter-connected by two endless chains 32 and 33 which serve as a means for conveying the filaments through the furnace chambers 15, 13, 12, 14, and 17. The conveyer is driven by means of any suitable motor such as 34, the speed of the conveyer being conveniently regulated by means of gear reductions. In the preferred form of the apparatus the conveyer is driven by an electric motor, the speed of which is substantially constant for commercial variations in the line voltage.

A shelf 35 mounted beneath the table 10 serves to support the chains 32 and 33 in their horizontal travel outside the furnace chambers. In the furnace chamber proper the chains are supported on the steel sheet 36 which constitutes the floor of the furnace chamber. The main furnace chamber as shown in Fig. 3 consists of an alundum muffle 37, about which are wound three parallel circuits of resistor wire 38, each circuit comprising seven turns of wire around the body of the main furnace chamber. Evidently the number of circuits and the number of turns per circuit will vary according to the size of the oven and the intensity of the heat and heat regulation desired. These wires are then embedded in the alundum cement 39 which is surrounded by a sheet metal covering consisting of two sections 40 and 41. This sheet metal section is completely surrounded by a coating of Sil-O-Cel heat insulating fire brick 42, which in turn is inclosed in a sheet metal cover 43. The heat insulator 42 is made of such a thickness that the temperature of the exterior covering 43 will not be materially affected by the temperature of the interior of the oven.

The ends of the chambers 15 and 17 are partly closed by the metal sheet 43, an opening sufficiently large at each end being retained to allow the free passage of the chains into and from each end of the oven. The plates 43 serve to diminish to a minimum longitudinal drafts through the oven chambers.

By means of the resistor 38 current is applied to the main baking chamber 12 so as to obtain at all times an evenly distributed heat in said chamber. To maintain such a heat in the main baking chamber the resistor must be uniformly distributed over the entire length of the chamber, and when thus wired a single circuit will not permit of much heat regulation, such regulation being restricted entirely to current strength variations, the limit of which will soon be reached by the safe current carrying capacity of the resistor or wire. The improved oven as herein disclosed is designed for uniform heat distribution and likewise a wide range of heat regulation. This is accomplished by winding the resistor on said oven chamber in a plurality of circuits, as illustrated in Fig. 7, all of which are evenly distributed over the entire oven surface. Each of these parallel circuits is provided with an individual switch whereby each circuit may be connected to or disconnected from the main circuit as desired and then connected in series with a suitable current varying means and current source. In the preferred form of the oven, as shown in Fig. 7, each of the three parallel circuits has its individual switch 44, and these are serially connected to the rheostat 45 and any suitable source of current supply, such as the battery 46. These parallel circuits when thus wired can be connected with the source of supply as desired and constitute means whereby large steps in heat regulation are obtained. Thus with the three circuits shown in the preferred form of oven the heat regulation will be varied 33⅓ per cent. as any one of these circuits is connected to or disconnected from the main circuit, and as each of said circuits is uniformly distributed over the entire oven surface the uniformity of the heat in the oven will not be impaired thereby. It will be evident that any number of such circuits may be used and that any combination of such circuits in series or multiple may be utilized, the applied heat always being uniform since all of the windings are evenly distributed over the oven surface. Thus rough heat regulation is rapidly and efficiently obtained by switching the resistor circuits, and the more minute regulation may be then procured by the current variations in said circuits which is readily obtained by the serially connected rheostat 45.

Mounted at the extreme right-hand end of chamber 17 in the space behind the door 20 on the floor 36 of the oven chamber is a set of contact springs 50 illustrated in detail in Fig. 6. These contact springs consist of the flexible spring 51 and the contact point 52 which are insulated from one another. These contact springs are mounted on the floor of the oven, as indicated in Fig. 2, with the angle of inclination of the spring 51 in the direction of travel of the plate 53 as it progresses through the oven chambers. Consequently when the plate 53 rides over the spring 51, said spring is depressed which closes a series circuit including the bell 54 and a battery. The bell 54 will thus be operated whenever a plate 53 reaches this part of the chamber 17.

The chains 32 and 33 are composed of links, each alternate link of which is equipped with the projecting ears 55, as illustrated in Fig. 4. These projecting ears 55 of the chains 33 and 32 serve to hold the plate 53 on which are mounted a plurality of mounted stem filament assemblies, as clearly indicated in Fig. 4. These filament assemblies, as illustrated in Fig. 5, consist of the stem 57, in which is secured the mounting or leading-in wire 58, to one end of which is attached the lamp filament 59 by means of the paste 60, and to the other end of which the feed wire 61 is brazed at 62.

The oven as herein disclosed is utilized for the baking of carbon filaments, but it can obviously be used for the baking of any articles in which constant, reliable baking results are desired. In the process of assembling carbon filaments a carbon filament 59 is attached to the mounting wires 58 by means of the carbon paste 60. The purpose of the baking operation is to remove the gases from the carbon paste 60. This is an exceedingly delicate operation and great caution must be exercised to avoid excessively rapid heating whereby the external surface of the carbon paste 60 will be baked and in effect case hardened before the interior moisture of the paste has been removed. Consequently it is essential in baking these filaments that the temperature to which they are subjected be gradually and regularly raised. Likewise in cooling, the temperature should be gradually decreased to avoid unequal contractions which would result in cracking of the filament mounting stem. To accomplish this purpose the oven proper consists of the three chambers 12, 13, and 14 and the conveyer chains 32 and 33, by means of which the filaments are gradually heated to the temperature of the main baking chamber and are then gradually cooled as they leave said chamber.

As hereinbefore stated, the main baking chamber 12 is electrically heated by means of the circuits composed of the resistor 38. The temperature in this chamber can consequently be definitely and absolutely regulated by varying the strength of the current flowing in the resistor wire after the rough heat regulation has been completed by switching of the resistor coils. The temperature in the main chamber 12 is recorded on the recording thermometer 70, and when the resistor current strength has been set the temperature condition in said chamber should remain practically constant, slight variation thereof being recorded by the thermometer. The pre-heating chamber 13 is heated principally by convection, the heated air in the main chamber 12 displacing the cooler air in the chamber 13, and this action together with the constant movement of cool parts of the conveyer toward the main chamber 12 causes a gradual rise in the temperature of chamber 13 as the chamber 12 is approached. The cooling chamber 14 is similarly heated, but in addition obtains considerable heat due to heat radiation from the chains, filaments, and filament carriers as they pass through this chamber. Said radiation gradually decreases with a resulting gradual decrease in the temperature of the chamber 14 as the distance from the chamber 12 is increased.

In the operation of the oven a filament carrying plate, such as 53, on which the desired number of mounted stem filament assemblies, shown in Fig. 5, have been placed, is inserted in the chamber 15 and placed between the links of the chains, as shown in Fig. 4, after the heat in the baking chamber 12 has been regulated as hereinbefore described. The chain is constantly driven by means of the motor 34, the speed depending upon the bake desired, and hence the filament carrier will be gradually drawn first through the chamber 15, then through the pre-heating chamber in which the temperature of the filaments will be gradually raised, then into the main baking chamber 12 in which the filaments will be completely baked, then through the cooling chamber 14, and finally into the chamber 17 from which the mounting plate 53 may be removed from either of the doors 18, 19, or 20, depending upon the amount of filament cooling that is desired.

If the operator should neglect to remove the filament mounting plate 53 when it reaches the end of the chamber 17 the plate 53 will glide over the contact spring 51 and close the circuit through the bell 54, thereby indicating to the operator that a filament plate has reached the end of the oven and should be removed. It will be noted that the oven is completely inclosed except at the extreme ends where a small opening is retained to allow the free passage of the chains. This will maintain the temperature of the oven practically constant, as drafts through the oven are thereby practically avoided, and this condition is absolutely necessary if thorough, complete, and uniform baking is desired. Thorough baking of the lamp filaments is essential since all the gases must be removed from the paste before the filament is incorporated in the lamp. If the gases are not all removed and the filament assembled in the lamp, gases will be generated when the lamp is illuminated and the life of the lamp will be seriously reduced.

The oven as herein described operates very efficiently since the temperature and period of baking in the oven, when once set, by determining the resistor combination, the current flow therethrough, and the speed of the conveyer, is practically independent of the operator. The invention is not confined to the particular use herein described, but is useful whenever it is desired to automatically control baking time intervals and produce a gradual and even application of heat.

What is claimed is:

1. An oven for baking incandescent lamp filaments comprising in combination, a main baking chamber, an electric heating means inclosing said chamber, a pre-heating chamber and a cooling chamber directly connected to either side of said main baking chamber, a feeding chamber and a removing chamber directly connected respectively to said pre-heating chamber and said cooling chamber, a conveying means whereby the filaments are drawn through said chambers at a uniform, predetermined rate, and signaling means associated with said removing chamber operated when said conveyer has drawn said filaments through said chambers to the end of said removing chamber.

2. An oven for baking incandescent lamp filaments comprising in combination, a main baking chamber, an electric heating means inclosing said chamber, a feeding and a pre-heating chamber directly connected to one end of said main baking chamber, a cooling and a removing chamber directly connected to the other end of said main baking chamber, a chain conveyer operating through said chambers, a filament supporting means carried by said conveyer, and a signaling means operated by said filament supporting means when the filaments have been drawn through said chambers.

3. An oven for baking incandescent lamp filaments comprising in combination, a main baking chamber, an electric heating means comprising a plurality of parallel resistor circuits uniformly distributed over and inclosing and completely surrounding said chamber, a source of current supply for said means, a heat insulating means inclosing said electric heating means, a pre-heating and a cooling chamber inter-connected by said main baking chamber, a temperature recording means associated with said main baking chamber, and a conveyer consisting of two parallel chains whereby the filaments are drawn through said chambers at a uniform, predetermined rate.

4. In a device for baking incandescent lamp filaments, the combination with a main baking chamber, of an electric heating means inclosing said chamber comprised of a plurality of circuits uniformly distributed over said baking chamber, a source of current supply for said means, means whereby any one of said circuits may be switched in or out of circuit with said source to change the heat intensity in said chamber without changing the uniformity thereof, a pre-heating chamber and a cooling chamber interconnected by said main baking chamber, and a conveying means for drawing the filaments through said chambers.

5. In an oven for baking incandescent lamp filaments, the combination with a main baking chamber, of an electric heating means comprising a plurality of parallel circuits uniformly distributed over said baking chamber whereby the heat is evenly applied to all parts of said chamber, a source of current supply for said means, means associated with each of said circuits for switching them into and out of connection with said source to vary the intensity of the heat applied but not affecting its uniformity, means to control the intensity of the current flowing in said circuits, a pre-heating and a cooling chamber in direct communication with said main baking chamber, an admission and a removing chamber, and a conveying means operating through said chambers which carries the filaments through said chambers.

In witness whereof, I hereunto subscribe my name this 4th day of November A. D., 1916.

FREDERIC S. KOCHENDORFER.